United States Patent
Chang et al.

(10) Patent No.: US 9,996,568 B2
(45) Date of Patent: Jun. 12, 2018

(54) INDEX MAINTENANCE BASED ON A COMPARISON OF REBUILD VS. UPDATE

(71) Applicant: International Business Machines Corporation, Armonk, NY (US)

(72) Inventors: Yuan-chi Chang, Yorktown Heights, NY (US); Jason Crawford, Yorktown Heights, NY (US); Liana L. Fong, Yorktown Heights, NY (US); Wei Tan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 14/144,924

(22) Filed: Dec. 31, 2013

(65) Prior Publication Data

US 2015/0186441 A1    Jul. 2, 2015

(51) Int. Cl.
*G06F 17/00*        (2006.01)
*G06F 17/30*        (2006.01)

(52) U.S. Cl.
CPC .............................. *G06F 17/30336* (2013.01)

(58) Field of Classification Search
CPC ............................................... G06F 17/30336
See application file for complete search history.

(56) References Cited

U.S. PATENT DOCUMENTS

| | | | |
|---|---|---|---|
| 6,282,627 B1 | 8/2001 | Wong et al. | |
| 7,028,022 B1* | 4/2006 | Lightstone | ........ G06F 17/30336 |
| 7,149,758 B2 | 12/2006 | Takaki et al. | |
| 7,636,444 B2 | 12/2009 | Cronin | |
| 7,689,535 B2 | 3/2010 | Bernard | |
| 7,890,497 B2 | 2/2011 | Folkert et al. | |
| 8,566,300 B2 | 10/2013 | Murthy et al. | |
| 2005/0027725 A1 | 2/2005 | Folkert et al. | |
| 2006/0080345 A1* | 4/2006 | Murthy | ............... G06F 17/2205 |
| 2006/0155946 A1* | 7/2006 | Ji | .......................... G06F 3/0617 |
| | | | 711/162 |
| 2008/0301098 A1* | 12/2008 | Bernard | ............ G06F 17/30572 |
| 2010/0191707 A1* | 7/2010 | Kokhan | ............ G06F 17/30115 |
| | | | 707/649 |

FOREIGN PATENT DOCUMENTS

| | | |
|---|---|---|
| CN | 1501289 A | 6/2004 |
| CN | 102129458 A | 7/2011 |
| CN | 102819406 A | 12/2012 |

\* cited by examiner

*Primary Examiner* — Augustine K Obisesan
*Assistant Examiner* — Lahcen Ennaji
(74) *Attorney, Agent, or Firm* — Scully, Scott, Murphy & Presser, P.C.; Yeen C. Tham, Esq.

(57) ABSTRACT

A method, system and computer program product for index maintenance in a computer system comprising a plurality of nodes, a database, and an index to the database. In one embodiment, the method comprises, for a defined period of time, building a snapshot of selected change requests received by the nodes to change the database. After this defined period of time, a selection is made, based on specified criteria, whether to rebuild a new index to the database, or to add entries to a current index. When the selection is to rebuild a new index, the new index is rebuilt based on data in the database and in the change requests in the snapshot. When the selection is to add entries to a current index, entries are added to the current index based on data in the database and in the change requests in the snapshot.

20 Claims, 7 Drawing Sheets

Index building: rebuild vs. add

- if d/D>1/3 * REBUILD on (d+D)
  - (1) Abandon the index on D and rebuild index on (d+D) using map/reduce ($R_B+P_I$)
- Else UPDATE on d
  - (2) Build index on d, item by item ($R_B + P_I + R_B + D_I$)

INDEX MAINTENANCE BASED ON A COMPARISON OF REBUILD VS. UPDATE

BACKGROUND

This invention generally relates to maintaining indices for databases, and more specifically, to determining whether to rebuild or to update an index.

The astonishing growth and diversity in data has profoundly affected the way data should be stored and served. To address the challenges in flexible schema and elasticity, many new distributed data stores dealing with columns, key/value pairs, documents and graphs have emerged, and these new data stores are often collectively identified as NoSQL data stores. Each store has its strengths in a specific application domain and makes tradeoffs among consistency, availability and operational performances. A full-fledged NoSQL store that supports the convergence of transactional and analytics workload should offer balanced read and write performance. A category of NoSQL stores is based on LSM (Log Structured Merge) tree. This category of NoSQL stores is optimized for write, and secondary indices would be built for efficient point queries.

BRIEF SUMMARY

Embodiments of the invention provide a method, system and computer program product for index maintenance in a computer system comprising a plurality of nodes, a database, and an index to the database, and wherein the nodes receive requests to change the contents of the database. These change requests are in the form of adding new entries to the database or updating existing entries in the database. In one embodiment, the method comprises building a snapshot of change requests received by the nodes, over a defined period of time, to change the contents of the database by holding these change requests in a queue. After the defined period of time, a selection is made, based on specified criteria, whether to rebuild a new index to the database, or to update entries to the current index to the database. When the selection is to rebuild a new index, the new index is rebuilt based on data in the database and data in the change requests in the snapshot. When the selection is to update entries to the current index, entries are updated to the current index based on the data in the database and the data in the change requests in the snapshot. This updating of the current index may include adding new entries to the current index, changing entries in that index, and deleting entries from the current index.

In an embodiment, said specified criteria include time needed for rebuilding a new index, and time needed for updating entries to the current index.

In one embodiment, the selection whether to rebuild a new index or to update the current index would include estimating time needed for the rebuilding a new index, and estimating time needed for updating the current index. The selection, either rebuilding or updating, is based on these estimated times needed for rebuilding and updating.

In an embodiment, rebuilding an index includes scanning through all the records in the database and the snapshot, and updating the current index includes scanning through all the records in the snapshot and accessing for specified records in the database.

In one embodiment, estimating the time needed to rebuild an index includes estimating time needed for scanning through all the records in the database and the snapshot, and estimating the time needed for updating the current index includes estimating time needed for scanning through all the records in the snapshot and accessing the specified records in the database.

In one embodiment, the specified records are determined by records in the snapshot.

In an embodiment, the specified criteria include an amount of the data in the database and an amount of the data in the snapshot.

In one embodiment, building the snapshot includes identifying a specified time to start building the snapshot, and informing each of the nodes of the computer system of this specified time.

In an embodiment, identifying the specified time to start the building the snapshot includes receiving timestamps from each of the nodes, and identifying said specified time based on the latest of the received timestamps.

In one embodiment, building the snapshot further includes identifying a pause period of time, to begin before the snapshot is built, during which the nodes do not accept any change requests to change contents of the database, and using the latest and the earliest of the received timestamps to determine this pause period of time.

DETAILED DESCRIPTION

Figure 1:
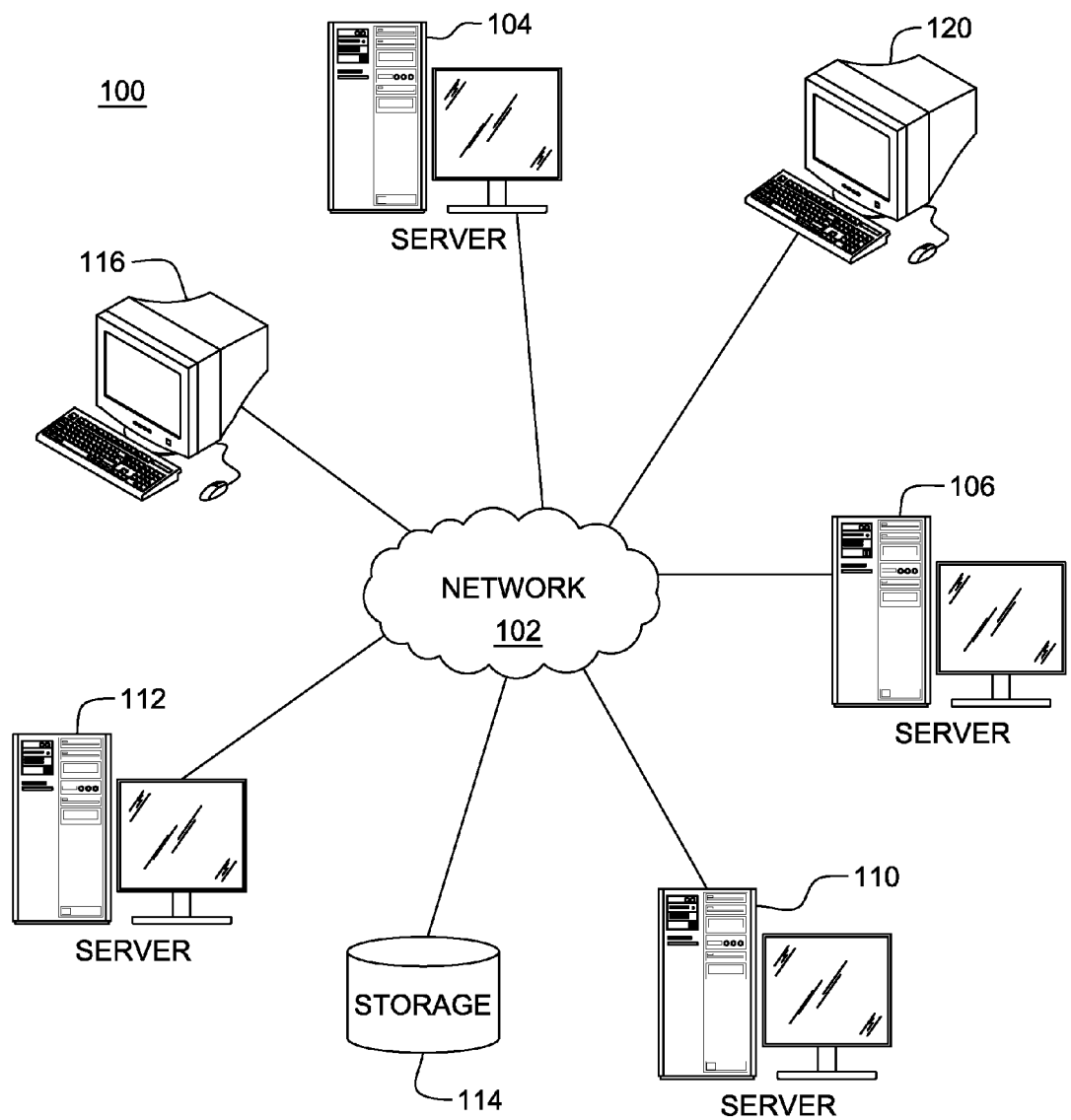
FIG. 1 shows a networked computing system in which embodiments of the invention may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the drawings, FIG. 1 depicts a pictorial representation of a networked computer system 100 in which embodiments of this invention may be implemented. Networked system 100 contains a network 102, which is the medium used to provide communications links between various devices and computers connected together within the networked system. Network 102 may include connections, such as wire, wireless communication links, or fiber optic cables, and network 102 may also be the Internet.

In the depicted example, servers 104, 106, 110 and 112 are connected to network 102 along with storage unit 114. In addition, computers 116 and 120 are connected to network 102. These computers 116 and 120 may be, for example, personal computers, workstations, laptops, mobile computers or other computing devices. In the depicted example, servers 104, 106, 110 and 112 provide data, such as boot files, operating system images, and applications to computers 116 and 120.

Networked system 100 may include additional servers, computers, and other devices not shown. Networked system 100 may be implemented as a number of different types of networks, such as for example, the Internet, an intranet, a local area network (LAN), or a wide area network (WAN). FIG. 1 is intended as an example, and not as an architectural limitation for the invention.

Figure 2:
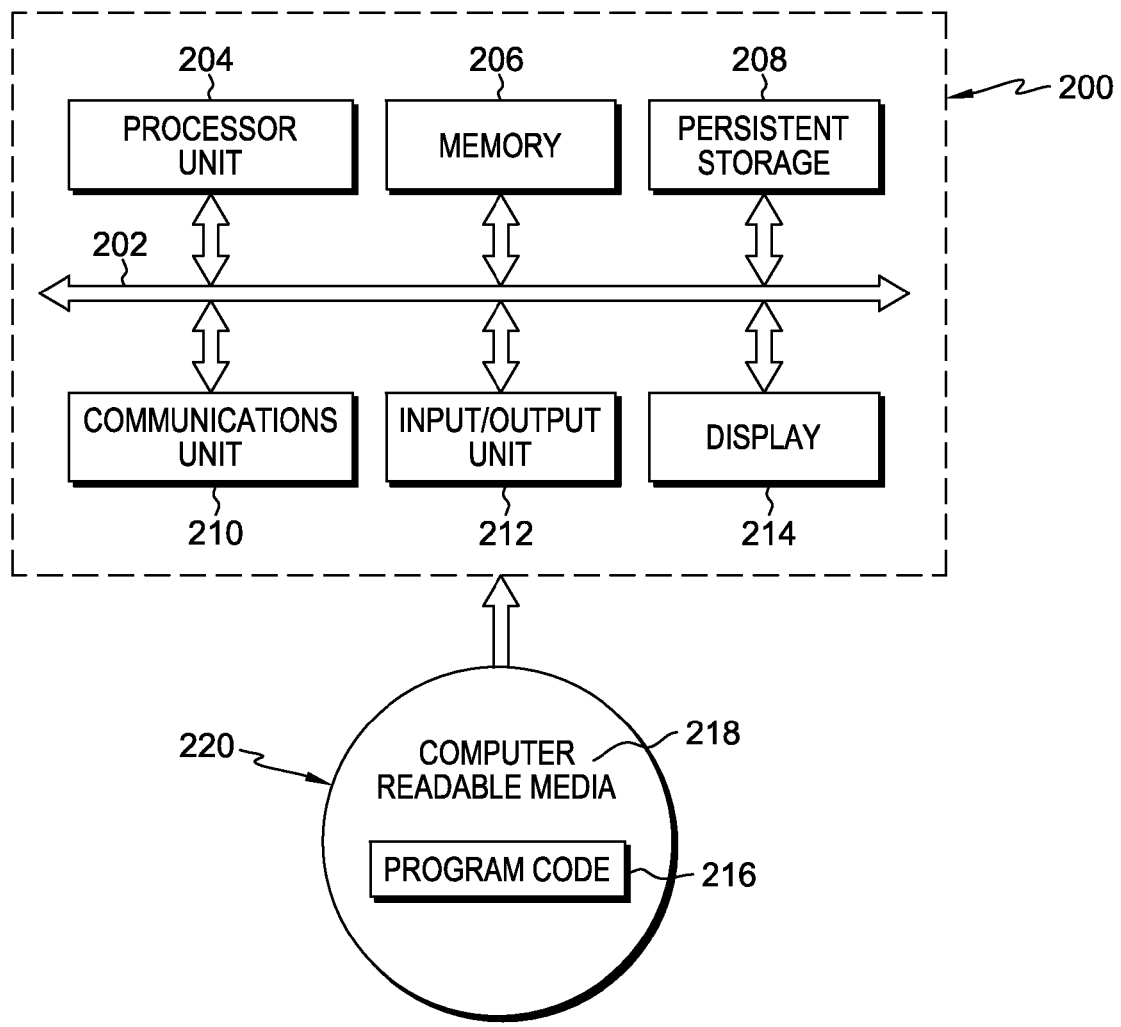
FIG. 2 illustrates details of a computing device that may be used as a server or computer in the environment shown in FIG. 1.

With reference now to FIG. 2, a block diagram of a data processing system 200 is shown. Data processing system 200 is an example of a computer, such as servers 104, 106, 110 and 112, or computers 116 and 120 in FIG. 1. In this illustrative example, data processing system 200 includes communications fabric 202, which provided communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Memory 206 and persistent storage 208 are examples of storage devices. Memory 206, in these examples, may be a random access memory or any other suitable volatile or non-volatile storage device. Persistent storage 208 may take various forms depending on the particular implementation. For example, persistent storage 208 may be a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

This invention, generally relates to maintaining indexes for databases in computer systems. Indexes are used to access databases, and a large database may require a number of large indexes that need to be maintained to access the database efficiently. Many new distributed data stores have emerged dealing with column, key/value pairs, documents, and graphs. These new data stores are often collectively referred to as NoSQL. Each NoSQL store has its strengths in specific application domains and makes tradeoffs among consistency, availability, and operational performances.

A high performance NoSQL store that supports the convergence of transactional and analytic workloads should offer balanced read and write performance. A category of No SQL stores is based on LSM (Log Structured Merge) tree. This category is optimized for write, but does not have an optimized technique for point queries. A secondary index can be a powerful way to enhance point and range queries for certain types of NoSQL, such as Apache HBase.

Indexes usually need to be maintained or updated when a database is changed, and embodiments of the invention provide a procedure for selecting a way to maintain or update a database after changes have been made to the database. In an embodiment of the invention, for a defined period of time, a snapshot is built of selected requests to change the contents of the database. After that defined period of time, a selection is made, either to rebuild an index to the database, or to update entries to a current index to the database.

One option to deploy a distributed database is to use multiple, shared-nothing commodity servers. Each server uses its own clock to timestamp the records it manages, and all servers synchronize their clocks in a periodical base. Therefore, there is a lack of fined grained synchronized global time among multiple servers (aka, nodes) in the distributed databases we discussed in embodiments of this invention.

Figure 3:
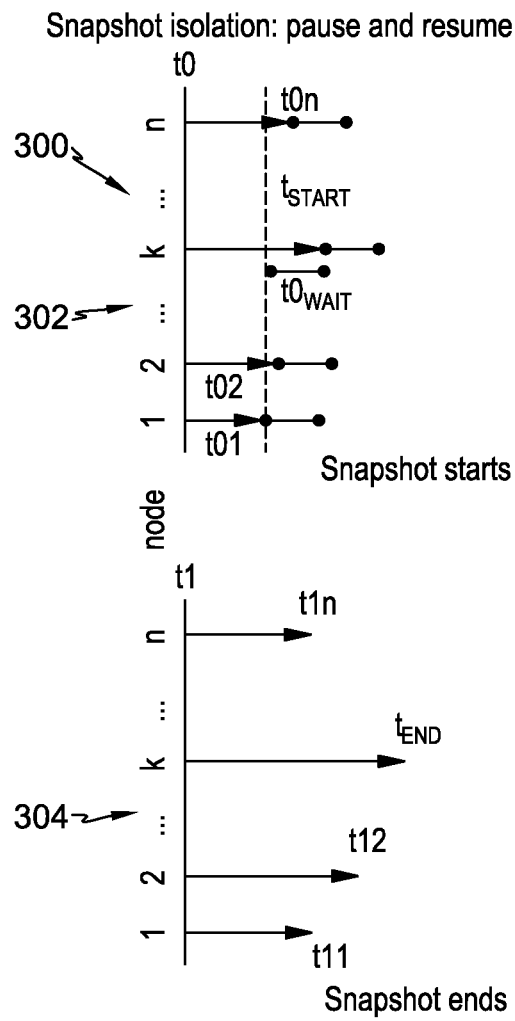
FIG. 3 illustrates a period of time in which a snapshot of data is built, and a pause and resume feature used in embodiments of the invention.

FIG. 3 illustrates a timeline, in an embodiment of the invention, for building a snapshot, as described above, in a multi-node computer system. This disclosed example uses a procedure referred to as pause and resume. In this procedure, for a length of time before the snapshot is begun, the nodes do not accept requests to change the contents of the database. These change requests are in the form of adding new entries to the database or updating existing entries in the database. After this length of time, referred to as the pause period, all the nodes begin to again accept requests to change the contents of the database. This pause period eliminates the effects of clock differences among the nodes.

In the timeline 300 of FIG. 3, starting at a global time t0, each node puts any received read and write requests in a queue. Also, each node is asked for that node's last commit timestamp, and these timestamps are used to determine two values, $t_{start}$ and $t0_{wait}$. $t_{start}$ is set equal to the latest of these timestamps, and $t0_{wait}$ is set equal to $t_{start}$ minus the earliest of these timestamps, plus one. This ensures that $t_{wait}$ is never less than one.

With the example illustrated in FIG. 3, the timestamps from the nodes are represented at 302. The timestamp from node 1 is t01, the timestamp from node 2 is t02, and the timestamp from node n is t0n. The latest of these timestamps is from node k, and thus $t_{start}$ is set equal to this timestamp. The earliest of these timestamps is the timestamp from node 1, and thus $t_{wait}$ is set equal to $t_{start}$ minus the timestamp from node 1, plus one.

All nodes wait for $t0_{wait}$ and at that time, the nodes release the read and write requests in their queues. Starting from this point, all timestamps will be equal to or greater than $t_{start}+1$.

At global time t1, the read and write requests are put in a queue. Each node is again asked for its last commit timestamp, and these timestamps are referenced at 304. The timestamp from node 1 is t11, the timestamp from node 2 is t12, and the timestamp from node n is t1n. A value $t_{end}$ is set equal to the latest of these t1 timestamps, which in this example is the timestamp from node k. The requests inserted in the queue between $t_{start}$ and $t_{end}$ form a snapshot. All data inserted in this snapshot is timestamped as ($t_{start}$, $t_{end}$[W·Tan 1]].

If each snapshot follows this wait convention, the timestamps between any two adjacent snapshots will be monotonic and disjointed.

Figure 4:
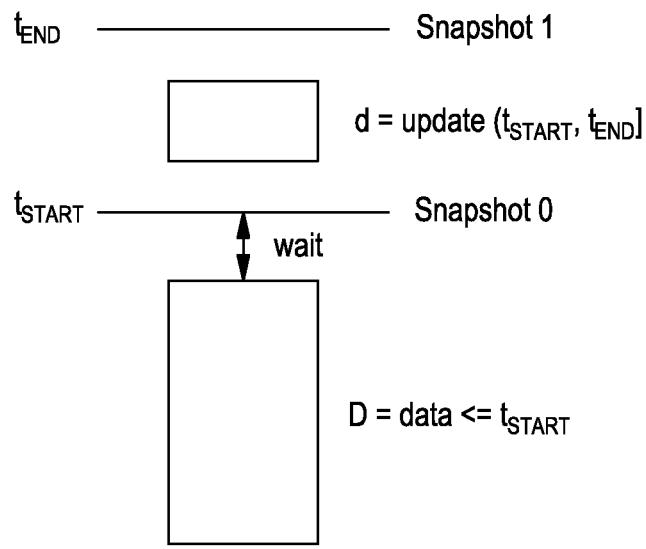
FIG. 4 illustrates a database D and a collection of data d from the snapshot, and the period of time in which the snapshot is built.

Once this snapshot is built, a decision is made as to how to maintain the index to the database. FIG. 4 illustrates the decision process in an embodiment of the invention. In embodiments of the invention, the decision is whether to rebuild a new index, or to update entries to a current index.

In FIG. 4, block "D" represents the data in a database before $t_{start}$. The data in the snapshot built between $t_{start}$ and $t_{end}$ is represented as "d."

Various criteria or factors may be used to determine whether to rebuild or update. Also, in embodiments of the invention, as described below, the criteria are adjusted or tuned over time.

As an example, the first time the decision is made, the decision may be based on the sizes of d and D, and more specifically, based on the ratio of the size of d to the size of D. These sizes may be measured in a number of ways. For instance, the sizes may be measured in terms of the number of bits in D and d, and as another example, the sizes may be measured in terms of the number of records in D and d.

With the example of FIG. 4, if the ratio of the number of records in d to the number of records in D is greater than ⅓, then a new index is rebuilt; otherwise entries are updated to the current index.

When the decision is to rebuild a new index, the old index on D is abandoned, and a new index is built on d plus D. Any suitable procedure may be employed to do this, and for example an application written using MapReduce programming model may be used. In this procedure, to build the new index, d and D are read (represented by $R_B$) and index entries for each record are put (represented by $P_I$) in the new index.

When the decision is to update the current index, d is read (represented by $R_B$) and entries for the records in d are put (represented by $P_I$) in the current index. Also, D is read (represented by $R_B$) and for each record in d that is also in D, the entry in the index for that record in D is deleted (represented by $D_I$) from the index.

Figure 5:
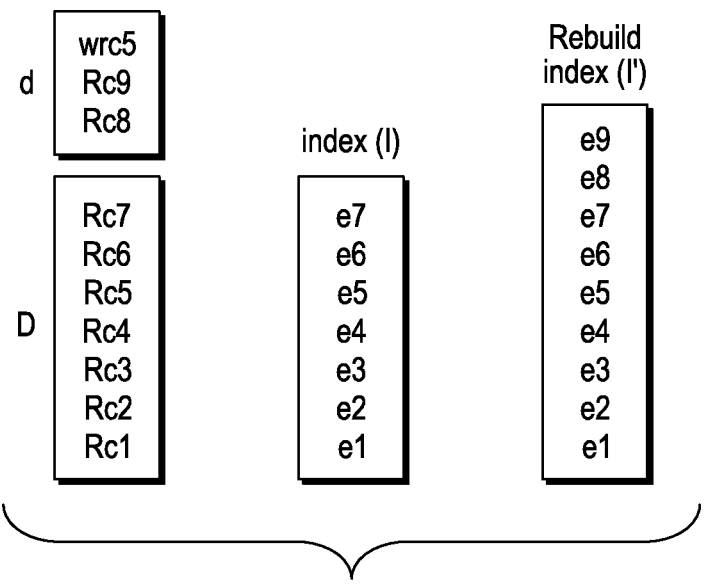
FIG. 5 shows a first example of an embodiment of the invention, in which a new index is rebuilt.
Figure 6:
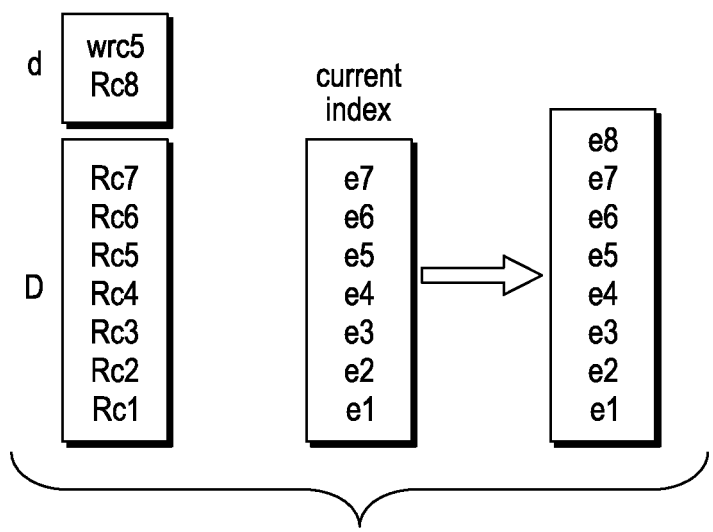
FIG. 6 shows a second example of an embodiment of the invention, in which a current index is modified by updating entries to that index.

FIGS. 5 and 6 show examples of this decision process and of the rebuild and update processes. In these examples, D has seven records, Rc1-Rc7, and index I has an entry e1-e7 for each of these records. As shown in FIG. 5, d has two new records Rc8 and Rc9 and an update wRc5 to record Rc5.

With the example in FIG. 6, d has one new record Rc8 and an update wRc5 for record Rc5.

With the D and d shown in FIG. 5, d/D is more than ⅓, and because of this, the index is rebuilt on d+D. The old index I is abandoned and a new index I' is built. For each record, an entry is added to the index I'. Only one entry is included in the new index for record Rc5, and this entry is based on the updated version wRc5 of the record in d.

In the example of FIG. 6, d has only two entries, R8 and an update wRc5 to record Rc5. As d/D is less than ⅓, the index is maintained by updating entries to the index. d is read and entries for each record in d are added to the index. D is read, and the entry in the index for record Rc5 in D is deleted from the index, avoiding duplicate entries in the index for Rc5.

In the rebuild process, an index is built from scratch. An index entry is built for the latest version of every record. In embodiments of the invention, there is no need to consider the old version of a record since the LMS scanner takes care of it. However, to rebuild the index, the scanner has to scan the whole table formed by d and D (d+D).

In the update process, additional entries for the index are built from the snapshot point. It is only necessary to build the index for data changed from a given time point, i.e., for data in d. However, to do this, it is necessary to read any old versions of records of d in D, and do an index delete if necessary.

Thus, the decision to rebuild vs. update can be considered as corresponding to the merits of scan vs. seek. Rebuild may require scanning through all the records in D, while the update option may only require seeking in D the older version of the few records in d.

Figure 7:
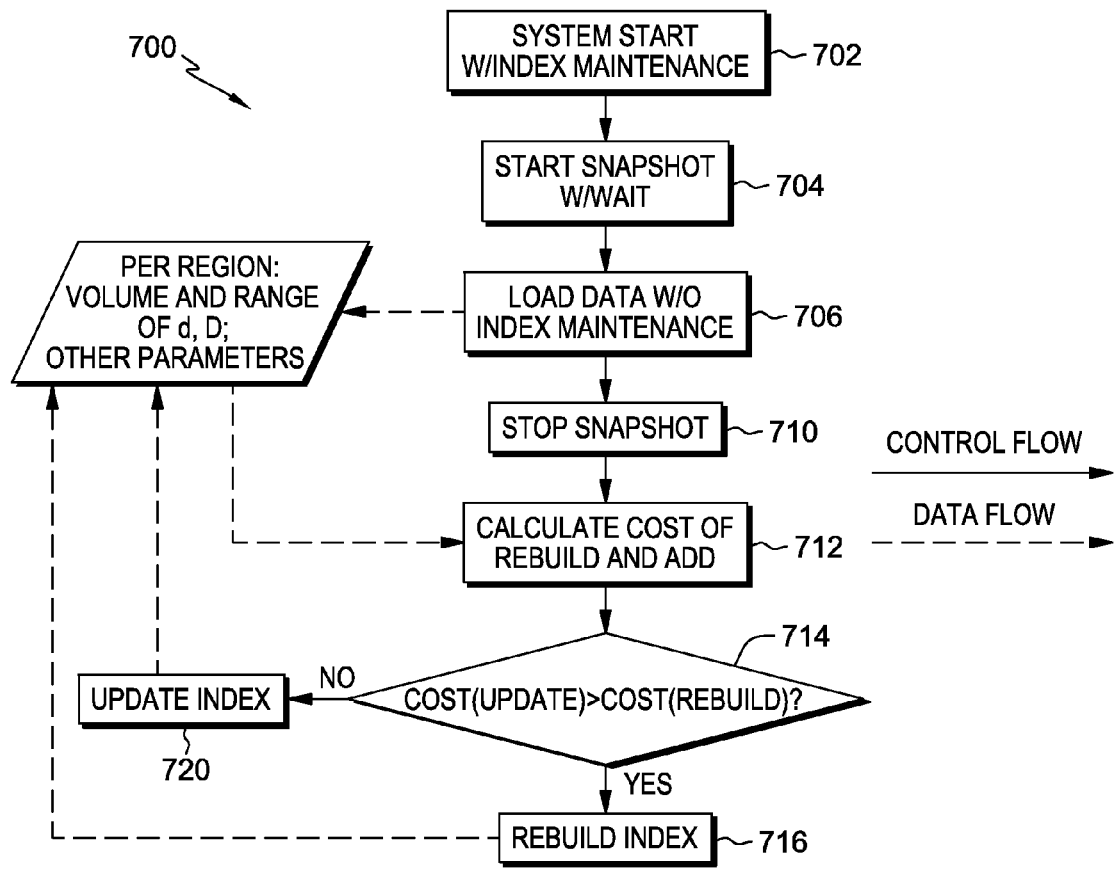
FIG. 7 is a flowchart showing a procedure, in an embodiment of the invention, for determining whether index maintenance should be done by rebuilding a new index or by updating entries to a current index.

One solution procedure of an embodiment of the invention is depicted in FIG. 7 at 700. In this procedure, the cost of the rebuilding vs. the cost of the update process is used to determine whether to rebuild or to update. This cost may be measured in various ways, and in embodiments of the invention, cost refers to time.

The procedure starts at 702; and at 704, the snapshot is started with the wait time. Step 706 is to accept the snapshot data d, without index maintenance; and the snapshot is stopped at 710. Step 712 is to calculate the cost of a rebuild process and the cost of an update process; and at 714, these two costs are compared. If the cost of update is greater than the cost of rebuild, the index is rebuilt at 716. If the cost of update is not greater than the cost of rebuild, then, at 720, the current index is updated—that is, entries for the records in d are added to the index, as described above.

Any suitable process may be employed to determine, or to estimate, the costs, in terms of time, of the rebuild and the update. As an example, the cost of a full index rebuild is:

$$(D+d)*s+(D+d)*[W\cdot\text{Tan }2]w,$$

and the cost of incremental index update is:

$$(d*r)+(d*w),$$

where:
D is the number of records in the database D,
d is the number of records in the snapshot d,
r represents the cost of reading a record in random order,
s represents the cost of reading a record in sequential order, and
w represents the cost of writing a record to the index.
If d' out of the d records in snapshot d are known to be with new keys that are not in the D records of database D, then the cost of incremental index update is:

$$[(d-d')*r]+(d*w).$$

In LSM, w is usually very small.

For examples, consider a database D that has a size of 100 GB. In one example, consider a snapshot d with a size of 10 MB (1% of D), and in another example, consider a snapshot d with a size of 100 MB (10% of D). The speed of sequential reads is $V_R$ which is 100 MB/sec, the size of each row in D and d is $s_r=1$ kB, and the seek time is $t_{seek}=5$ ms.

The estimated cost of rebuilding a new index is $(d+D)/V_R$. Thus, in the first example, the cost of rebuilding a new index is:

$$(10\text{ GB}+10\text{ MB})/100\text{ MB/sec}=100.1\text{ sec.}$$

and in the second example, the cost of rebuilding a new index is:

$$(10\text{ GB}+100\text{ MB})/100\text{ MB/sec}=101\text{ sec.}$$

The estimated cost of updating entries onto the current index is $(d/s_r)t_{seek}$. Thus, in the first example, the cost of updating the current index is:

$$(10\text{ MB}/1\text{ kB})*(5\text{ ms})=50\text{ sec.}$$

and in the second example, the cost of updating the current index is:

$$(100\text{ MB}/1\text{ kB})*(5\text{ ms})=500\text{ sec.}$$

In the first example, the cost of updating entries in the current index is less than the cost of rebuilding the index; and when deciding whether to rebuild or to update, the choice would be to update entries on to the current index. In the second example, in contrast, the cost of updating on to the current index is greater than the cost of rebuilding the index; and when deciding whether to rebuild or to update, the choice would be to rebuild the index.

The cost estimates may take into account the key ranges of d and D. These key ranges R(d) of d and R(D) of D can be determined from the metadata of d and D.

If d' out of the d records in snapshot d are known to be with new keys that are not in the D records of database D, then the estimated cost of rebuild is: $(d+D)/V_R$, and the estimated cost of updating entries is: $(d-d')/s_r*t_{seek}$.

When the keys are evenly distributed in the key range, $$d''=d*|R(d)\cap R(D)|/|R(d)|; d'=d-d''$$

where:
d is the number of records in snapshot d, and
|R(d)∩R(D)| is the number of records in the intersection set of snapshot d and database D.
If the keys are not evenly distributed in the key range, the histograms of the distribution of the key ranges in d and D are needed to give a more accurate estimation of d' and d".

In embodiments of the invention, cost pattern learning and workload optimization may be used in the cost estimation processes.

The cost estimate may not be 100% accurate due to workload fluctuations, the size of the index, the storage medium, and other factors. Parameters, such as r, s and w may be tuned or adjusted for each index.

At each index maintenance—either an incremental update or a full rebuild—the timestamps and the time interval between pause and resume times for the index building, are saved. Also, various characters may be saved for each update or rebuild; and, for instance, the cost of the update, the number of updates, key ranges, and the data store size may be saved.

The calculated estimated cost for an index maintenance (update or rebuild) may be compared to the actual cost of the maintenance, and this comparison may be used to tune the parameters for cost estimation to be used in the next iteration.

Figure 8:
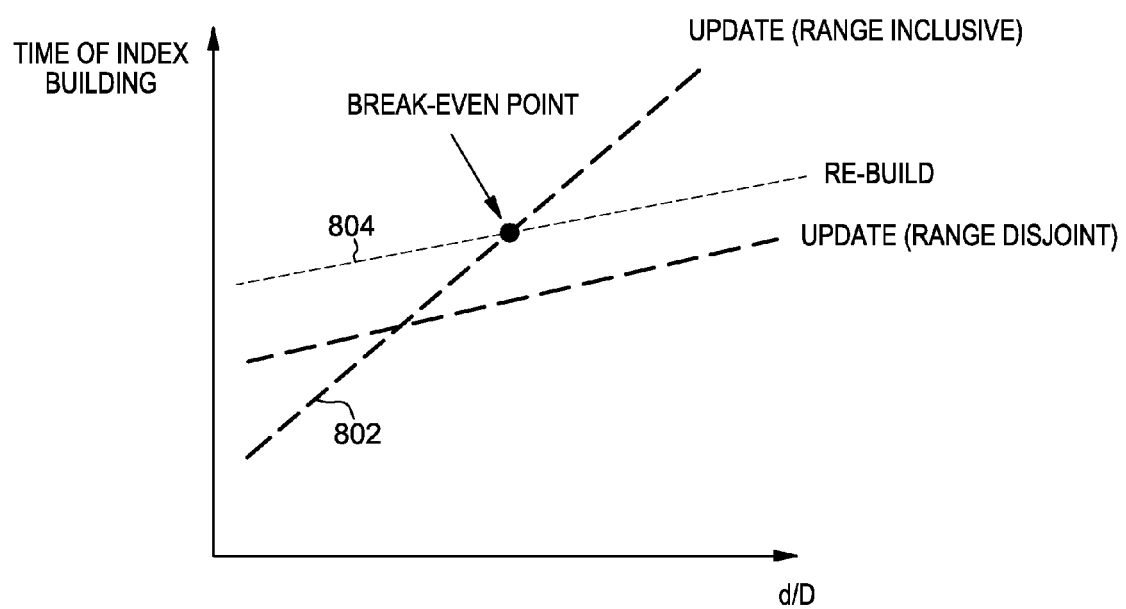
FIG. 8 is a graph depicting the time needed to rebuild a new index and the time needed to update entries to a current index for the different ranges as functions of the ratio of the amount of data in d and the amount of data in D.

FIG. 8 shows, as an example, how the cost of the update process, represented at 802, and the cost of the rebuild process, represented at 804, vary as a function of the ratio of d to D. As illustrated, when d is small compared to D, a rebuild is more costly, in terms of time, than an update. The cost of the update and the cost of the rebuild both increase as d become larger relative to D, and at a point, it becomes less costly to rebuild than to update.

While it is apparent that embodiments of the invention herein disclosed are well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of index maintenance in a computer system comprising a plurality of nodes, a database, and an index to the database, and wherein the nodes receive requests to change contents of the database, and each node timestamps records managed by said each node, the method comprising:
for a defined period of time, building a snapshot of change requests received by the nodes to change the contents of the database by holding said change requests in a queue, including
at a defined time, asking each of the nodes for a last timestamp of said each node,
receiving said last timestamps from all of the nodes,
using the received last timestamps from all of the nodes to determine a specified time to start the building the snapshot, and
after the determined specified time to start building the snapshot, the nodes putting a plurality of the change requests received by the nodes in a queue to form the snapshot;
once the snapshot is built, selecting, based on a specified comparison of the contents of the database and the change requests in the snapshot, between rebuilding a new index to the database, and updating entries to a current index to the database;
when the rebuilding a new index is selected, rebuilding the new index based on data in the database and data in the change requests in the snapshot; and
when the updating to a current index is selected, updating the current index based on the data in the database and the data in the change requests in the snapshot.

2. The method according to claim 1, wherein:
said specified comparison includes a comparison of time needed for the rebuilding the new index, and time needed for the updating entries to the current index;
the change requests received by the nodes are in the form of adding new entries to the database or updating existing entries in the database; and
the updating entries to the current index includes
adding one or more entries to the current index, and
reading the database and for each record in the snapshot that is also in the database, deleting from the current index an entry for said each record.

3. The method according to claim 1, wherein the selecting includes:
estimating time needed for the rebuilding the new index;
estimating time needed for the updating the current index; and
selecting one of the rebuilding the new index and the updating the current index based on the estimated time needed for rebuilding the new index and the estimated time needed for updating the current index.

4. The method according to claim 3, wherein:
the data in the database includes a multitude of records;
the data in the snapshot includes one or more records;
the rebuilding the new index includes scanning through all the records in the database; and
the updating the current index includes scanning through all the records in the snapshot and accessing for specified ones of the records in the database.

5. The method according to claim 4, wherein:
the estimating time needed to rebuild the new index includes estimating time needed for scanning through all the records in the database and the snapshot; and
the estimating time needed for updating the current index includes estimating time needed for scanning through all the records in the snapshot and seeking for the specified records in the database.

6. The method according to claim 5, wherein the specified records are determined by the records in the snapshot.

7. The method according to claim 1, wherein the comparison includes a comparison of an amount of the data in the database and an amount of the data in the snapshot.

8. The method according to claim 1, wherein the building a snapshot includes:
informing each of the nodes of the computer system of the specified time to start the building the snapshot.

9. The method according to claim 8, wherein the using the received last timestamps to determine a specified time to start the building a snapshot includes:
identifying said specified time based on the latest of the last timestamps received from the nodes.

10. The method according to claim 9, wherein the building a snapshot further includes:
identifying a pause period of time, to begin before the start of the building the snapshot, during which the nodes do not accept any change requests to change the contents of the database;
using the latest and the earliest of the received last timestamps to determine said pause period of time; and
after the pause period, the nodes resuming accepting the change requests to change the contents of the database.

11. An index maintenance system in a computer system comprising a plurality of nodes, a database, and an index to the database, and wherein the nodes receive requests to change contents of the database, and each node timestamps records managed by said each node, the index maintenance system comprising:
one or more hardware processor units configured for:
for a defined period of time, building a snapshot of change requests received by the nodes to change the contents of the database by holding said change requests in a queue, including
at a defined time, asking each of the nodes for a last timestamp of said each node,
receiving said last timestamps from all of the nodes, and
using the received last timestamps from all of the nodes to determine a specified time to start the building the snapshot, and
after the determined specified time to start building the snapshot, the nodes putting a plurality of the change requests received by the nodes in a queue to form the snapshot, once the snapshot is built, selecting, based on a specified comparison of the contents of the database and the change requests in the snapshot, between rebuilding a new index to the database, and updating entries to a current index to the database;

when the rebuilding a new index is selected, rebuilding the new index based on data in the database and data in the change requests in the snapshot; and when the updating entries to a current index is selected, updating entries to the current index based on the data in the database and the data in the change requests in the snapshot.

12. The index maintenance system according to claim 11, wherein the selecting includes:

estimating time needed for the rebuilding the new index;
estimating time needed for the updating the current index; and
selecting one of the rebuilding the new index and the updating the current index based on the estimated time needed for rebuilding the new index and the estimated time needed for updating the current index.

13. The index maintenance system according to claim 12, wherein:

the data in the database includes a multitude of records;
the data in the snapshot includes one or more records;
the rebuilding the new index includes scanning through all the records in the database;
the updating the current index includes scanning through all the records in the snapshot and accessing for specified ones of the records in the database;
the estimating time needed to rebuild the new index includes estimating time needed for scanning through all the records in the database and the snapshot; and
the estimating time needed for updating the current index includes estimating time needed for scanning through all the records in the snapshot and seeking for the specified records in the database.

14. The index maintenance system according to claim 11, wherein the specified comparison includes a comparison of an amount of the data in the database and an amount of the data in the snapshot.

15. The index maintenance system according to claim 11, wherein the building a snapshot includes:

identifying said specified time based on the latest of the last timestamps received from the nodes; and
informing each of the nodes of the computer system of the specified time.

16. An article of manufacture comprising:

at least one tangible computer readable hardware medium having computer readable program code logic for maintaining an index in a computer system comprising a plurality of nodes, a database, and an index to the database, and wherein the nodes receive requests to change contents of the database, and each node timestamps records managed by said each node, the computer readable program code logic, when executing, performing the following:

for a defined period of time, building a snapshot of change requests received by the nodes to change the contents of the database by holding said change requests in a queue, including at a defined time, asking each of the nodes for a last timestamp of said each node,
receiving said last timestamps from all of the nodes,
using the received last timestamps from all of the nodes to determine a specified time to start the building the snapshot, and
after the determined specified time to start building the snapshot, the nodes putting a plurality of the change requests received by the nodes in a queue to form the snapshot, once the snapshot is built, selecting, based on a specified comparison of the contents of the database and the change requests in the snapshot, between rebuilding a new index to the database, and updating a current index to the database;

when the rebuilding a new index is selected, rebuilding the new index based on data in the database and data in the change requests in the snapshot; and when the updating entries to a current index is selected, updating entries to the current index based on the data in the database and the data in the change requests in the snapshot.

17. The article of manufacture according to claim 16, wherein the selecting includes:

estimating time needed for the rebuilding the new index;
estimating time needed for the updating the current index; and
selecting one of the rebuilding the new index and the updating the current index based on the estimated time needed for rebuilding the new index and the estimated time needed for updating the current index.

18. The article of manufacture according to claim 17, wherein:

the data in the database includes a multitude of records;
the data in the snapshot includes one or more records;
the rebuilding the new index includes scanning through all the records in the database;
the updating the current index includes scanning through all the records in the snapshot and accessing for specified ones of the records in the database;
the estimating time needed to rebuild a new index includes estimating time needed for scanning through all the records in the database; and
the estimating time needed for updating entries to a current index includes estimating time needed for seeking for the specified records in the database.

19. The article of manufacture according to claim 16, wherein the specified comparison includes a comparison of an amount of the data in the database and an amount of the data in the snapshot.

20. The method according to claim 1, wherein:

during the building the snapshot, when the nodes receive the change requests to change contents of the database, the change requests are not made to the contents of the database.

* * * * *